US010744878B2

(12) United States Patent
Yao

(10) Patent No.: US 10,744,878 B2
(45) Date of Patent: Aug. 18, 2020

(54) INFLATABLE STRUCTURE FOR BATTERY PROTECTION

(71) Applicant: VOLVO CAR CORPORATION, Gothenburg (SE)

(72) Inventor: Jianfeng Yao, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 624 days.

(21) Appl. No.: 15/010,218

(22) Filed: Jan. 29, 2016

(65) Prior Publication Data
US 2016/0221443 A1    Aug. 4, 2016

(30) Foreign Application Priority Data

Jan. 29, 2015    (EP) .................................... 15153017

(51) Int. Cl.
*B60L 3/00*        (2019.01)
*H01M 2/10*        (2006.01)
*B60L 50/64*       (2019.01)
*B60K 1/04*        (2019.01)
*H01M 10/0525*     (2010.01)

(52) U.S. Cl.
CPC .............. *B60L 3/0007* (2013.01); *B60K 1/04* (2013.01); *B60L 50/64* (2019.02); *H01M 2/1016* (2013.01); *H01M 2/1094* (2013.01); *H01M 10/0525* (2013.01); *B60K 2001/0438* (2013.01); *H01M 2220/20* (2013.01)

(58) Field of Classification Search
CPC ...... B60L 3/0007; B60L 11/1879; B60K 1/04; B60K 2001/0438; H01M 10/0525; H01M 2/1094; H01M 2/1016; H01M 2220/20
See application file for complete search history.

(56) References Cited

U.S. PATENT DOCUMENTS

2007/0267848 A1    11/2007  Harase et al.
2011/0213509 A1*    9/2011  Onnerud ............ H01M 2/1077
                                              700/297
2011/0250477 A1    10/2011  Yoshida et al.
2011/0315464 A1    12/2011  Yokoyama et al.
(Continued)

FOREIGN PATENT DOCUMENTS

CN    101048299 A    10/2007
CN    102227831 A    10/2011
(Continued)

OTHER PUBLICATIONS

Extended European Search Report dated Apr. 7, 2015, Application No. 15153017.7-1360, Applicant Volvo Car Corporation, 4 Pages.
(Continued)

*Primary Examiner* — Michael L Dignan
(74) *Attorney, Agent, or Firm* — Brooks Kushman P.C.

(57) ABSTRACT

An energy storage module arranged in a vehicle comprises an energy storage cell arranged in a casing, an inflatable element arranged between the casing and the energy storage cell and to at least partly cover a surface portion of the energy storage cell, and an inflating unit in communication with a detection unit arranged to determine a crash severity in the event of an accident for the vehicle. The inflating unit is arranged to inflate the inflatable element when the crash severity exceeds a predetermined threshold.

14 Claims, 8 Drawing Sheets

(56) References Cited

U.S. PATENT DOCUMENTS

| | | | | |
|---|---|---|---|---|
| 2013/0017421 A1* | 1/2013 | Onnerud | ................. | B60R 21/01 |
| | | | | 429/61 |
| 2013/0022851 A1* | 1/2013 | De Oliveira | ............. | B60K 1/04 |
| | | | | 429/100 |
| 2015/0145236 A1 | 5/2015 | Park et al. | | |
| 2015/0162593 A1* | 6/2015 | Lee | ....................... | H04W 88/08 |
| | | | | 429/150 |
| 2016/0046251 A1* | 2/2016 | Wolkenstein | ......... | B60L 3/0007 |
| | | | | 701/46 |

FOREIGN PATENT DOCUMENTS

| | | |
|---|---|---|
| CN | 102666166 A | 9/2012 |
| CN | 102823026 A | 12/2012 |
| CN | 104670148 A | 6/2015 |
| WO | 2011059374 A1 | 5/2011 |
| WO | 2013180611 A1 | 12/2013 |

OTHER PUBLICATIONS

The State Intellectual Property Office of Peoples Republic of China, Office Action for corresponding Chinese Application No. 201610172628.9, dated Nov. 28, 2019, 17 pages including translation.

* cited by examiner

INFLATABLE STRUCTURE FOR BATTERY PROTECTION

CROSS-REFERENCE TO RELATED APPLICATIONS

This application claims foreign priority benefits under 35 U.S.C. § 119(a)-(d) to European patent application number EP 15153017.7, filed Jan. 29, 2014, which is incorporated by reference in its entirety.

TECHNICAL FIELD

The present disclosure relates to an energy storage module arranged in a vehicle and to a method for protecting energy storage cells of the energy storage module.

BACKGROUND

Electric and hybrid vehicles have recently become a more common sight on roads worldwide. They have one thing in common and that is they all require a large and powerful rechargeable energy storage, also known as a battery. In most such batteries, several battery cells are stacked together to form a battery powerful enough to provide energy for the vehicle to drive for example several tens of kilometers. The battery cells are in most cases mechanically fixed together with a common frame or enclosure to form a single unit which is conveniently mounted in the vehicle. Furthermore, the size of a battery providing sufficient power for driving an electric or hybrid energy is relatively large, whereby the battery cells tend to be closely packed in order to reduce the size of the battery.

The high powers of the batteries constitute a high risk, in particular for passengers of the vehicle but also for the vehicle itself. For example, in case of an accident causing an impact on the battery, a short circuit may occur which may result in a fire. Therefore, a protection system of some type may be useful.

US20110250477 discloses a battery module provided with an air-bag system arranged outside the module for absorbing an impact. However the protection for the cells in the module is limited and an impact force may not be efficiently distributed in order to avoid damage to the cells.

Therefore, there is a need for improved protection for battery cells arranged in a battery module of an electric or hybrid vehicle.

SUMMARY

In view of the above, it is a general object of the present disclosure to provide an energy storage module which provides an improved protection for an energy storage cell in the event of a crash.

According to a first aspect of the present disclosure it is therefore provided an energy storage module arranged in a vehicle, the energy storage module comprising: an energy storage cell arranged in a casing; an inflatable element arranged between the casing and the energy storage cell and to at least partly cover a surface portion of the energy storage cell; and an inflating unit in communication with a detection unit arranged to determine a crash severity in the event of an accident for the vehicle, wherein the inflating unit is arranged to inflate the inflatable element when the crash severity exceeds a predetermined threshold.

The inflatable element is such that it may be filled with air or gas, and such that a shape of the inflatable element is varied as a result of the filled air or gas. Thus, the inflatable element may be flexible.

The detection unit may measure a signal and determine a crash severity based on the signal. Alternatively, a signal from a safety restraint system (SRS) of the vehicle may be used for determining the crash severity, thus the detection unit may be part of the SRS.

The inflating unit is arranged to provide air or gas to the inflatable element and to inflate the inflatable element with the gas or air. When the crash severity exceeds the predetermined threshold, the inflating unit almost instantly initiates inflating of the inflatable element. Instantly may be within (the list is non-exhaustive) less than 1 s, less than 500 ms, less than 250 ms, less than 100 ms, less than 50 ms or even less than 10 ms upon receipt of the signal from the detection unit.

The present disclosure is based on the realization that damage to an energy storage cell in the event of a crash for a vehicle using the energy storage cell may be at least partly avoided by arranging a protection in the form of an inflatable element near the energy storage cell. By placing the inflatable element between the energy storage cell and the casing accommodating the energy storage cells (and the inflatable element), the inflatable element may efficiently distribute loads from an impact over a large surface area of the energy storage cell in the event of e.g., a crash.

According to an embodiment of the disclosure, the inflatable element may be plate-shaped. A plate shape should be regarded as that the inflatable element, when inflated, has a thickness which is less than at least one of the height and the width of the inflatable element. Preferably, the thickness of the inflatable element (when inflated) is substantially less than at least one of the height and the width of the inflatable element. The thickness may for example be less than half of the dimension of the height and/or the width of the inflatable element, or less than 30%, or 20%, or 15%, or 10% (the list is non-exhaustive) of the dimension of the height and/or the width of the inflatable element.

According to an embodiment of the disclosure, the inflatable element may be comb-shaped or rail fence-shaped or grid-shaped. The inflatable element may thus take different shapes other than a plate shape. Furthermore, the inflatable element may comprise through-holes. With a certain shape the distribution of loads in the event of a crash may be customized depending on e.g., the application or the location in the vehicle of the energy storage module.

According to an embodiment of the disclosure, the inflatable element is arranged to cover the entire surface portion of the energy storage cell.

The inflatable element may be made from for example a metal sheet, plastic or a fabric. For example, a metal composition may comprise aluminum, steel, or stainless steel. A plastic may comprise e.g., polyurethane, polypropylene, polystyrene, polymethylmethacrylate, polyvinyl chloride, nylon, polycarbonate, etc. A fabric may be a woven and/or a non-woven material.

In some embodiments the energy storage module may comprise the detection unit. For example, the detection unit may be arranged on the side of the casing of the energy storage module.

In one embodiment of the disclosure, the inflatable element is arranged in contact with the casing and with the energy storage cell such that, in an inflatable state, the inflatable element substantially fills a space from the energy storage cell to the casing in at least one direction. In other words, the space between the energy storage cells and the casing may be almost filled for example in a stacking direction of a stack of energy storage cells, or in a direction perpendicular to the stacking direction.

In one embodiment of the disclosure, the energy storage module may comprise a plurality of stacked energy storage cells arranged in the casing, wherein the inflatable element may be arranged to cover at least a surface portion of more than one of said plurality of energy storage cells. In other words, the inflatable element may be arranged to extend to, and at least partly cover, a surface portion of more than one energy storage cell. This way, the inflatable element may protect more than one energy storage cell. For example, the inflatable element may be folded into an L-shape such that more than one side of a stack of the plurality of energy storage cells is at least partly covered.

In yet another embodiment of the disclosure, the energy storage module may comprise a plurality of stacked energy storage cells, wherein the inflatable element is a first inflatable element, the module may further comprise a second inflatable element arranged to at least partly cover a surface portion of a second one of the plurality of stacked energy storage cells on a side of the stack of energy storage cells different from a side of the stack where the first inflatable element is arranged, wherein the inflating unit is arranged to inflate the first inflatable element and the second inflatable element if the crash severity exceeds a predetermined threshold. Thus, there may be more than one inflatable element which is inflated in the event of the crash severity exceeding the predetermined threshold. The second inflating unit may be arranged to protect (overlap with) an energy storage cell different from the energy storage cell protected by the first inflatable element. This way, more than one energy storage cell may be protected.

According to an embodiment of the disclosure, the energy storage module may comprise a first and a second stack of energy storage cells arranged adjacent to each other, wherein the inflatable element extends to at least partly cover a surface portion of an energy storage cell of each of the first and the second stack of energy storage cells.

The energy storage cell(s) may be Li-ion battery cell(s).

According to a second aspect of the present disclosure, there is provided a method for protecting an energy storage cell of an energy storage module arranged in a vehicle, said energy storage module comprises an energy storage cell arranged in a casing, the method comprising the steps of: determine a crash severity in the event of an accident for the vehicle; and when the crash severity exceeds a predetermined threshold, inflating an inflatable element arranged between said casing and said energy storage cell.

According to an embodiment of the disclosure, the method may further comprise: maintaining the inflatable element in an inflated state for a time period. The time period should preferably be at least as long as a duration of the crash event, for example, the time period may be (the list is non-exhaustive) e.g., at least 1 minute, at least 10 s, at least 1 s, at least 500 ms, at least 250 ms, at least 100 ms, or at least 100 ms, etc. However, the time period may at the same time be less than about 10 minutes, less than about 5 minutes, or less than about 1 minute.

According to an embodiment of the disclosure, the method may further comprise: determining an impact direction of the accident, and adjusting the predetermined threshold according to the impact direction. Thus, the detection unit may determine the direction from which the impact occurred. This may be achieved if the detection unit is e.g., an accelerometer.

Further effects and features of this second aspect of the present disclosure are largely analogous to those described above in connection with the first aspect of the disclosure.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing currently preferred embodiments of the disclosure.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, the present disclosure is mainly described with reference to an energy storage module storage arranged in an electric vehicle in the form of a car. However, embodiments according to the disclosure may be applied to any type of electric or hybrid vehicle such as a truck, a fork lift, a boat, etc.

Figure 1A:
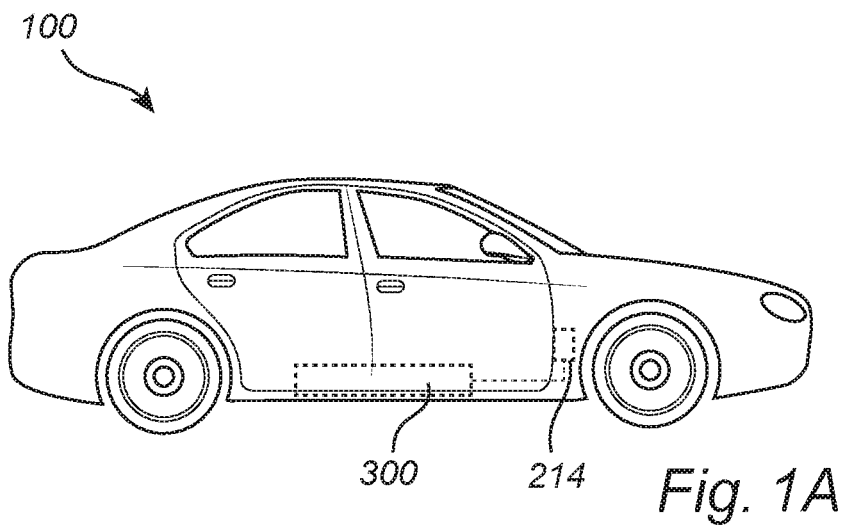
FIG. 1A schematically shows an example application for an example embodiment of an energy storage module.

FIG. 1A illustrates an electric vehicle 100 comprising an energy storage module 300. The energy storage module 300 is configured to provide power for operating the electric vehicle 100, thus the energy storage module 300 may be arranged to provide power to an electric motor for providing propulsion for the electric vehicle 100. The electric vehicle 100 is depicted as an electric car, however any other vehicle, such as e.g., a truck is suitable. The energy storage module 300 of this electric vehicle may be an energy storage module 300 according to example embodiments of the present disclosure. There is further a detection unit 214 arranged to determine a crash severity in the event of an accident for the vehicle 100.

Figure 1B:
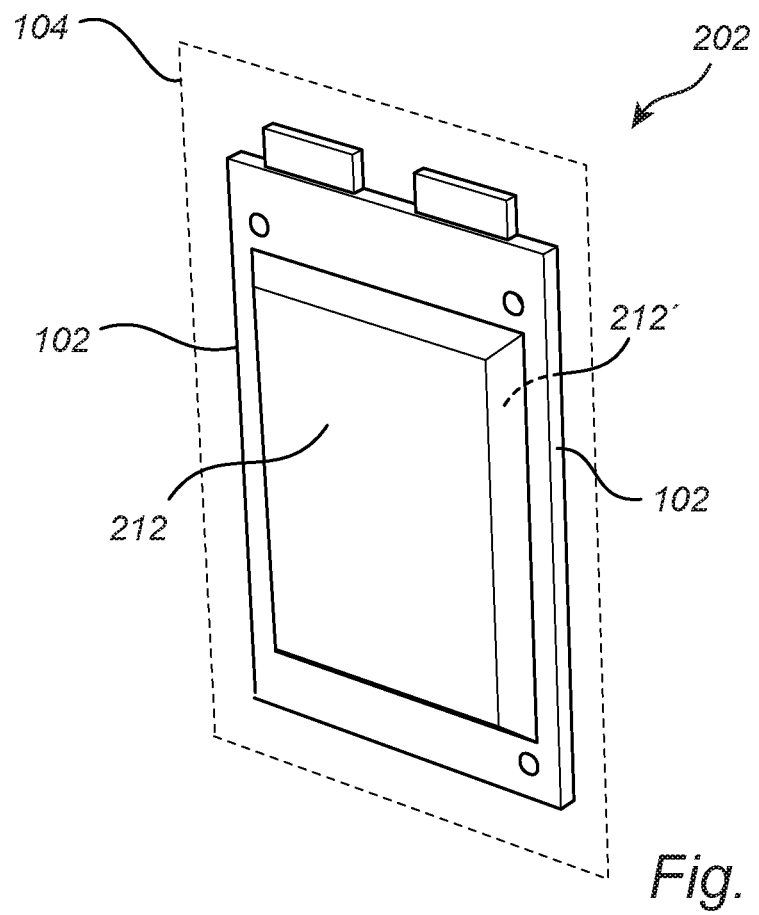
FIG. 1B illustrates an example energy storage cell.

FIG. 1B illustrates an example of an energy storage cell 202 (203, 204). The energy storage cell 202 is planar and has a main extension in a plane 104. The energy storage cell has a surface portion 212 and an edge portion 102 around the perimeter of the planar energy storage cell 202. The energy storage cell may thus comprise two opposite surface portions 212, 212' interconnected by the edge portion 102.

Figure 2A:
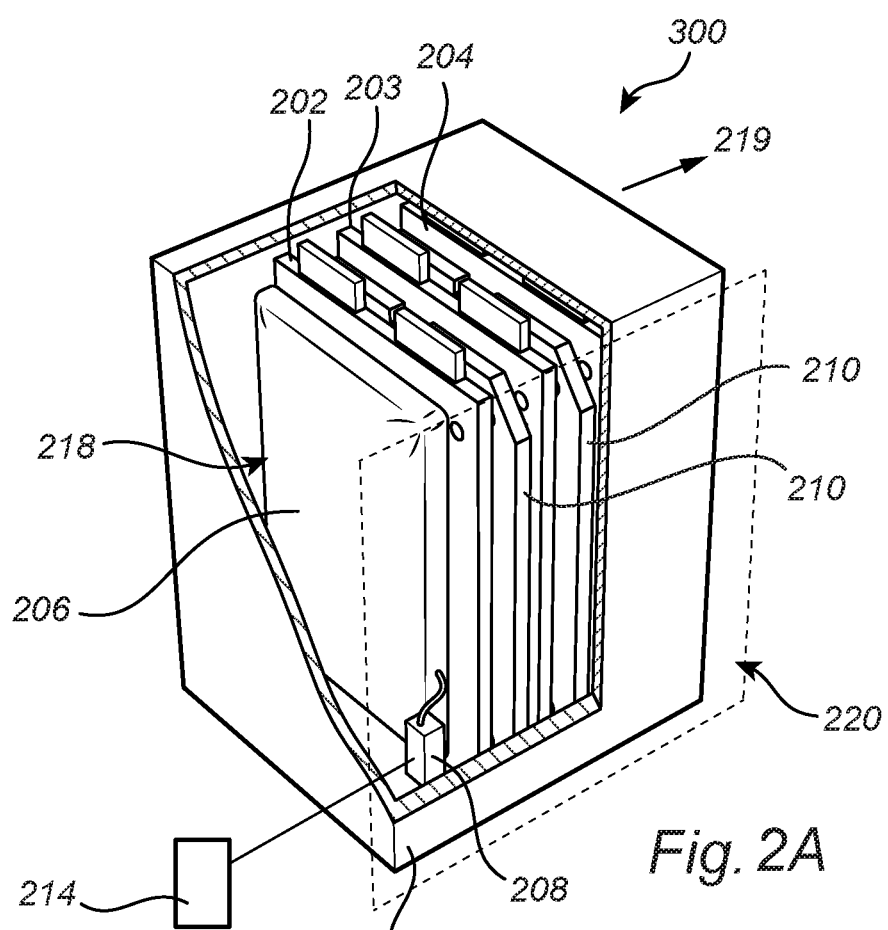
FIG. 2A shows an example energy storage module according to an embodiment of the present disclosure.
Figure 2B:
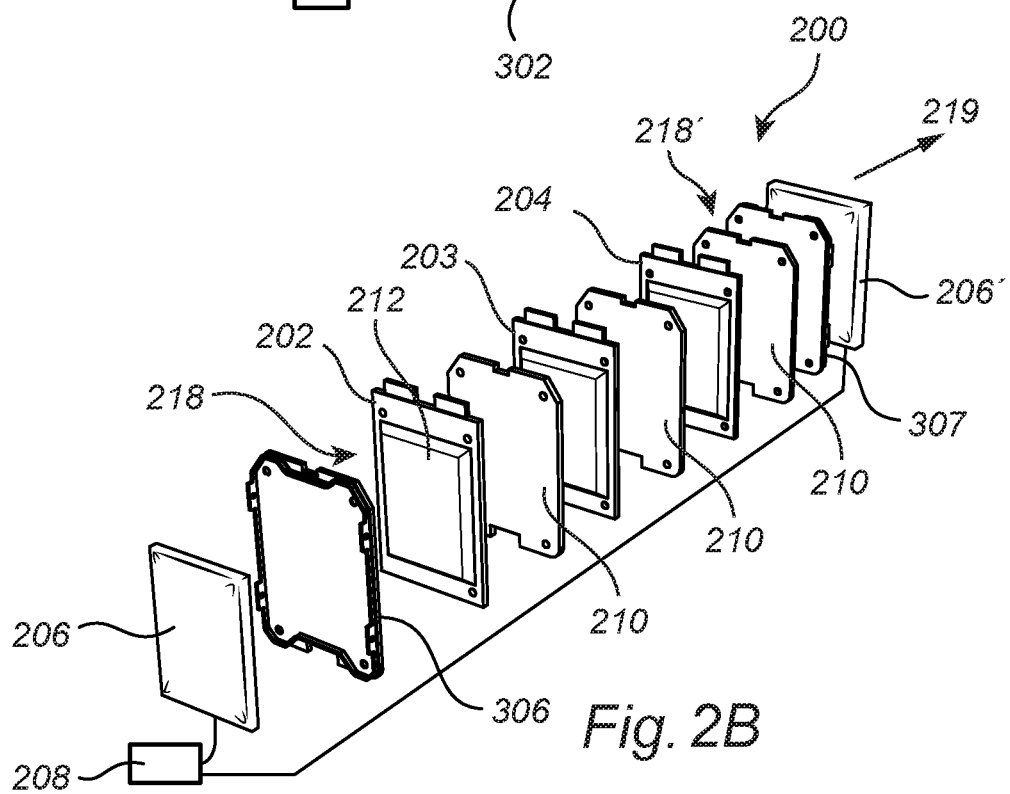
FIGS. 2B-D show an example arrangement of a stack of energy storage cells with inflatable elements and inflating unit(s)

FIG. 2A illustrates an energy storage module 300 according to an example embodiment of the disclosure. The energy storage module comprises an energy storage cell 202 arranged in a casing 302. Thus, the casing 302 accommodates the energy storage cell 202. In this example embodiment, the casing 302 accommodates several energy storage cells 202, 203, 204 arranged in parallel (thus the respective planes 104 are substantially parallel with each other), and optionally also cooling plates 210. There may further be other parts which are not shown that may be part of the energy storage module, for example, parts interconnecting energy storage cells and cooling plates such as plastic frames, foam, steel/plastic end plates and etc. Thus, the inflating element may be arranged between the casing and these other parts. For example, there may be end plates 306, 307 arranged at the end of a stack of energy storage cells 202-204. In FIG. 2A, the energy storage cells 202, 203, 204, and the cooling plates 210 are stacked in a stacking direction 219, the energy storage cells 202, 203, 204 may be Li-ion battery cells. Furthermore, there is an inflatable element 206 arranged between the casing 302 and the energy storage cell 202. As is more easily seen in FIG. 2B showing an exploded view of the energy storage cells 202, 203, 204, the cooling plates 210, and the inflatable element 206, the inflatable element 206 at least partly covers a surface portion 212 of the energy storage cell 202. This arrangement 200 (and the similarly described with reference to FIGS. 2C-D) may be arranged in a casing 302 to form an energy storage module. The inflatable element 206 may also cover the entire surface portion 212 of the energy storage cell 202. There is further an inflating unit 208 (thus a gas or air generator) arranged to inflate the inflatable element 206. The inflating unit 208 may be connected to or comprise its own gas or compressed air supply. The gas or compressed air supply may be arranged inside or outside the casing 302 and be connected to the inflating unit via e.g., a pipe (not shown). The inflating unit 208 is in communication with a detection unit 214 which is arranged to determine a crash severity in the event of an accident for the vehicle 100, the vehicle 100 using the energy storage module 300. If the determined crash severity exceeds a predetermined threshold, the inflating unit 208 inflates the inflatable element 206. Although the inflating unit 208 is here depicted inside the casing 302, the inflating unit 208 may also be arranged outside the casing 302. The detection unit 214 may for example comprise an accelerometer mounted on the vehicle or alternatively on the casing 302. The detection unit 214 may further comprise or at least be in communication with a processor for determining the crash severity in the event of a crash accident. The detection unit 214 may be a separate detection unit, or alternatively be part of a safety restraint system for the vehicle. In other words, a signal from the safety restraint system may be used to determine the crash severity. Alternatively, the crash severity may be determined by the safety restraint system itself. The inflating unit 208 may maintain the inflatable element 206 in an inflated state for a time period. Moreover, the energy storage module 300 may advantageously be arranged in the vehicle 100.

Figure 2C:
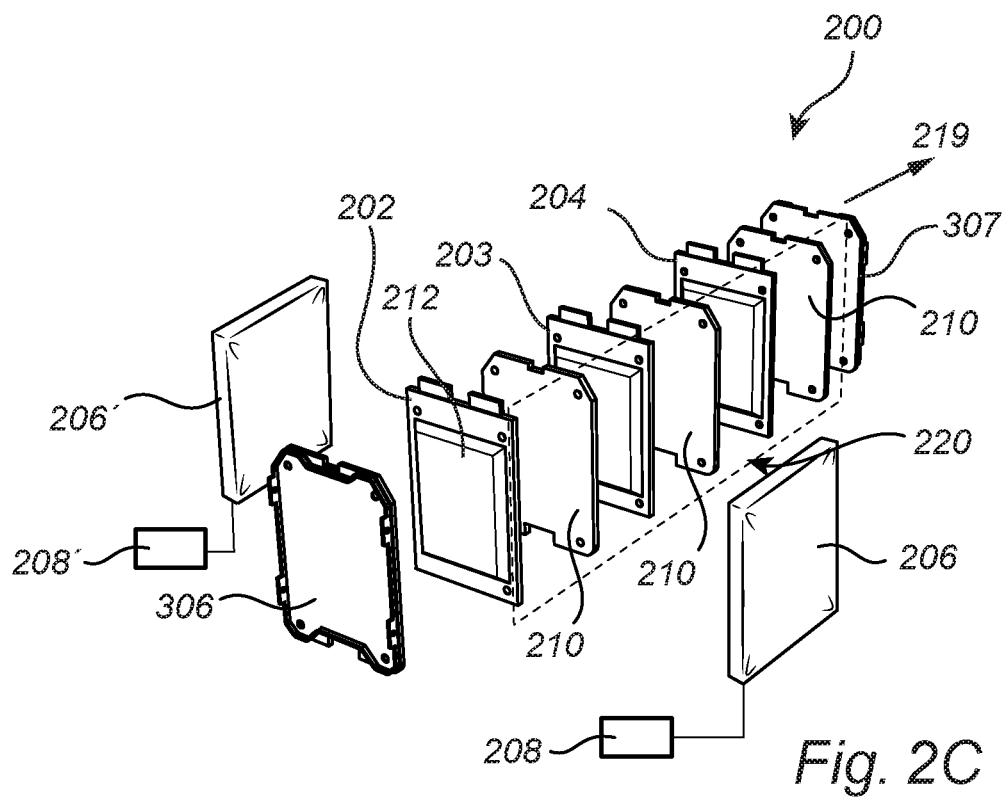

The inflatable element 206 may be plate shaped, as is shown in FIGS. 2A-C. The aplate shape means that the thickness 700 (700') (see FIGS. 7A-B) of the inflatable element 206 is substantially smaller than at least one of the width 702 (702') or the height 704 (704') of the inflatable element 206 (see FIGS. 7A-B). Furthermore, the inflatable element 206 may be made from metal sheet (e.g., comprising aluminum, steel, or stainless steel), plastic (e.g., polyurethane, polypropylene, polystyrene, polymethylmethacrylate, polyvinyl chloride, nylon, polycarbonate), or a fabric (e.g., woven or non-woven).

Figure 2D:
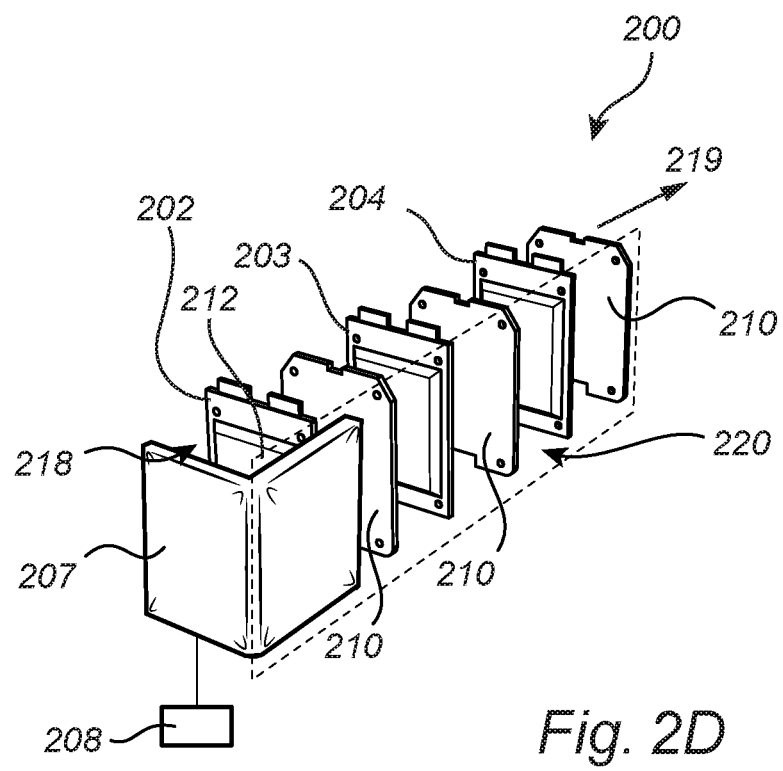

The inflatable element 206 may also extend to more than one side of the module 300. For example, the inflatable element 206 may be arranged to protect more than one of the energy storage cells 202, 203, 204, in the event of an accident. Thus, the inflatable element 206 may extend on two or more sides of the stack of energy storage cells 202, 203, 204. For example, as is shown in FIG. 2D, the inflatable element 206 may be arranged to extend on the side 218 and on the side 220 of the stack of energy storage cells 202, 203, 204, thus folded to reach both sides 218 and 220. Furthermore, the inflatable element may be arranged on the side 220 as shown in FIG. 2C. In FIGS. 2A-B, the inflatable element 206 is stacked in the stacking direction 219 with the energy storage cells, thus the inflatable element 206 is arranged in parallel with the energy storage cells 202, 203, 204 and facing the surface portion 212 of the energy storage cell 202. In FIG. 2C, the inflatable element 206 is arranged in parallel with the stacking direction 219 of the energy storage cells 202, 203, 204, substantially perpendicular to the planes 104 (shown in FIG. 1B) of the energy storage cells 202, 203, 204. In other words, in FIG. 2C the inflatable element 206 is arranged to at least partly cover the respective edge portion 102 of each of the energy storage cells 202, 203, 204.

In example embodiments, there may be an additional inflatable element 206', in addition to the first inflatable element 206. As is shown in FIG. 2B, the second inflatable element 206' is arranged to at least partly cover a surface portion of an energy storage cell 204 on a side 218' different from the side 218 of the stack 202, 203, 204 where the first inflatable element 206 is arranged. In this case the second inflatable element 206' is arranged on an opposite end side 218' of the stack of energy storage cells 202, 203, 204 compared to the end side 218 of the first inflatable element 206. The inflating unit 208 is arranged to inflate both the first inflatable element 206 and the second inflatable element 206' if the crash severity exceeds the predetermined threshold. Alternatively, the second inflatable element 206' has a corresponding second inflating unit. For example, as is shown in FIG. 2C, the second inflatable element 206' has a corresponding inflating unit 208'.

Figure 3:
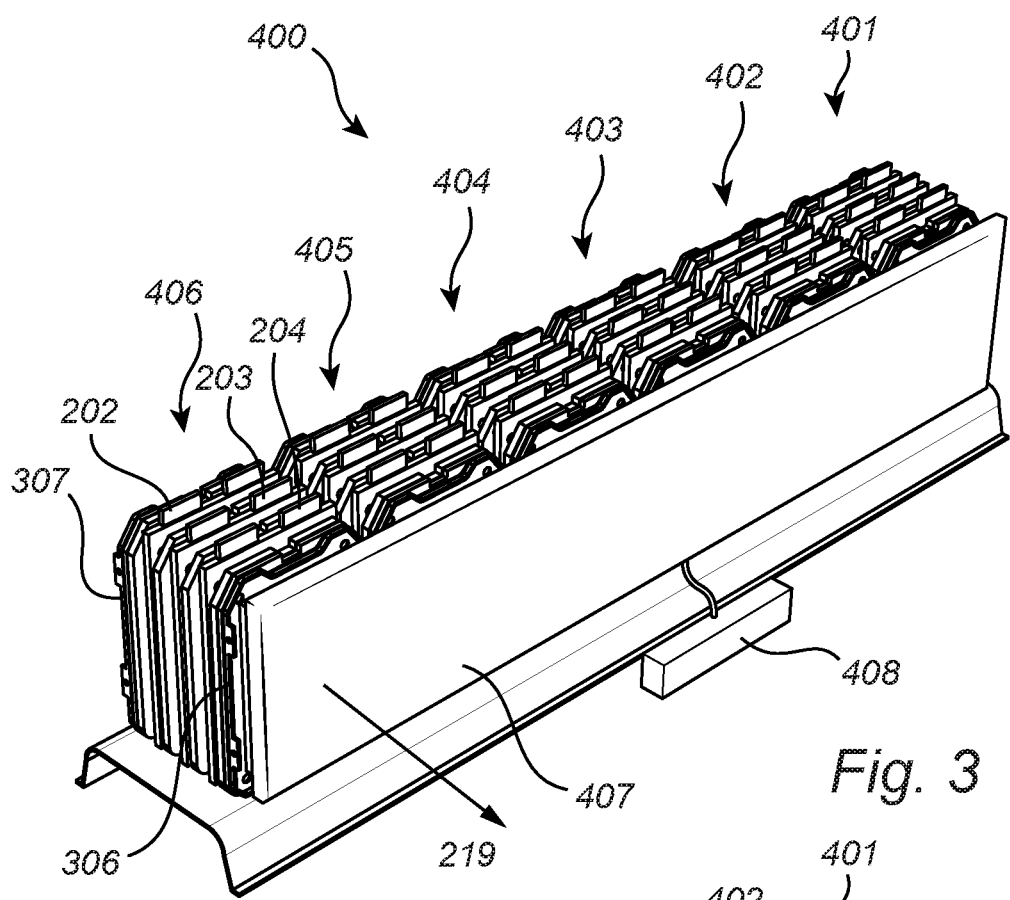
FIG. 3 shows an example energy storage module according to an embodiment of the present disclosure.
Figure 4:
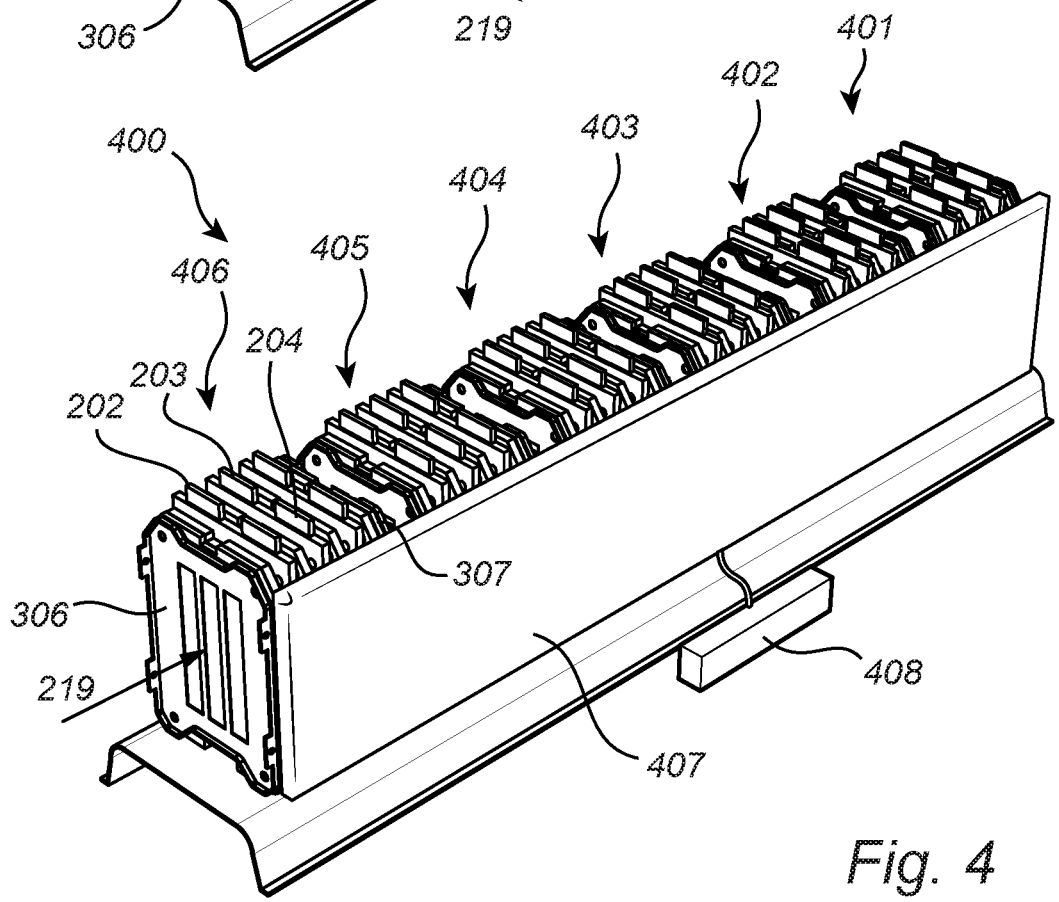
FIG. 4 shows an example energy storage module according to an embodiment of the present disclosure.

FIG. 3 shows an example energy storage module 400 according to an embodiment of the disclosure. In FIG. 3, there is at least a first 406 and a second 405 stack of energy storage cells 202, 203, 204 similar to what is described with reference to e.g., FIGS. 2A-D. In this embodiment shown in FIG. 3, an inflatable element 407 extends to at least partly cover a surface portion 212 of an energy storage cell 204 of each of the first 406 and the second 405 stack of energy storage cells. The inflatable element 407 may also extend to overlap with energy storage cells of several stacks 401-406 of energy storage cells as depicted in FIG. 3. In FIG. 3, the casing has been omitted for ease of understanding the drawing. The casing would accommodate the stacks 401-406 of energy storage cells, the inflatable element 407, and the inflating unit 408. Each of the stacks 401-406 of energy storage cells may be oriented in a different way with respect to the inflatable element 407 than what is shown in FIG. 3. For example, as is shown in FIG. 4 each of the stacks 401-406 may be arranged rotated 90 degrees such that the inflatable element 407 is arranged in parallel with the stacking direction 219 of the energy storage cells 202, 203, 204, substantially perpendicular to the planes 104 (shown in FIG. 1B) of the energy storage cells 202, 203, 204 of each stack 401-406. Thus, the inflatable element is arranged on the side of the edge portions 104 of the energy storage cells 202-204 of the stacks 401-406. Furthermore, other parts such as end plates 306, 307 may be stacked with the energy storage cells 202-204 at the ends of the stack. This would be possible also in the stacks described with reference to FIGS. 2A-D.

Figure 5A:
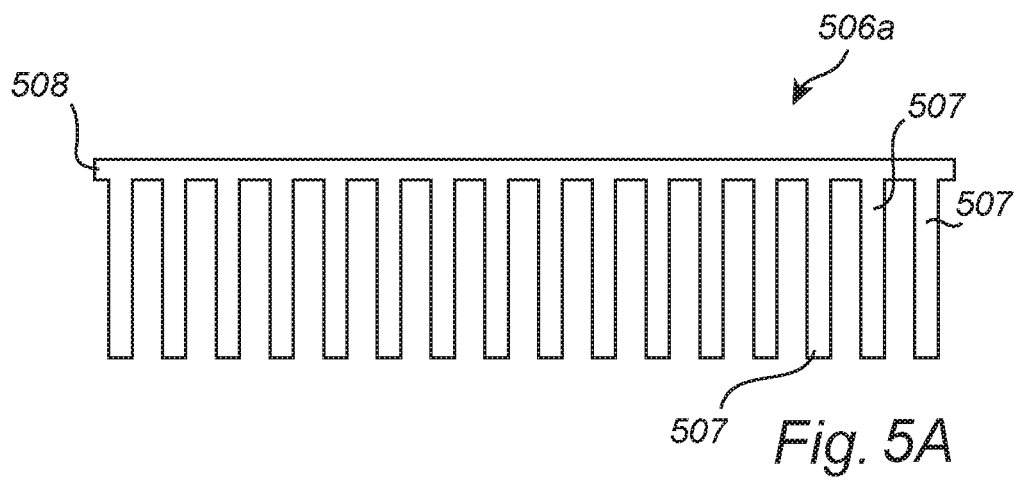
FIGS. 5A-D show example inflatable elements.
Figure 5B:
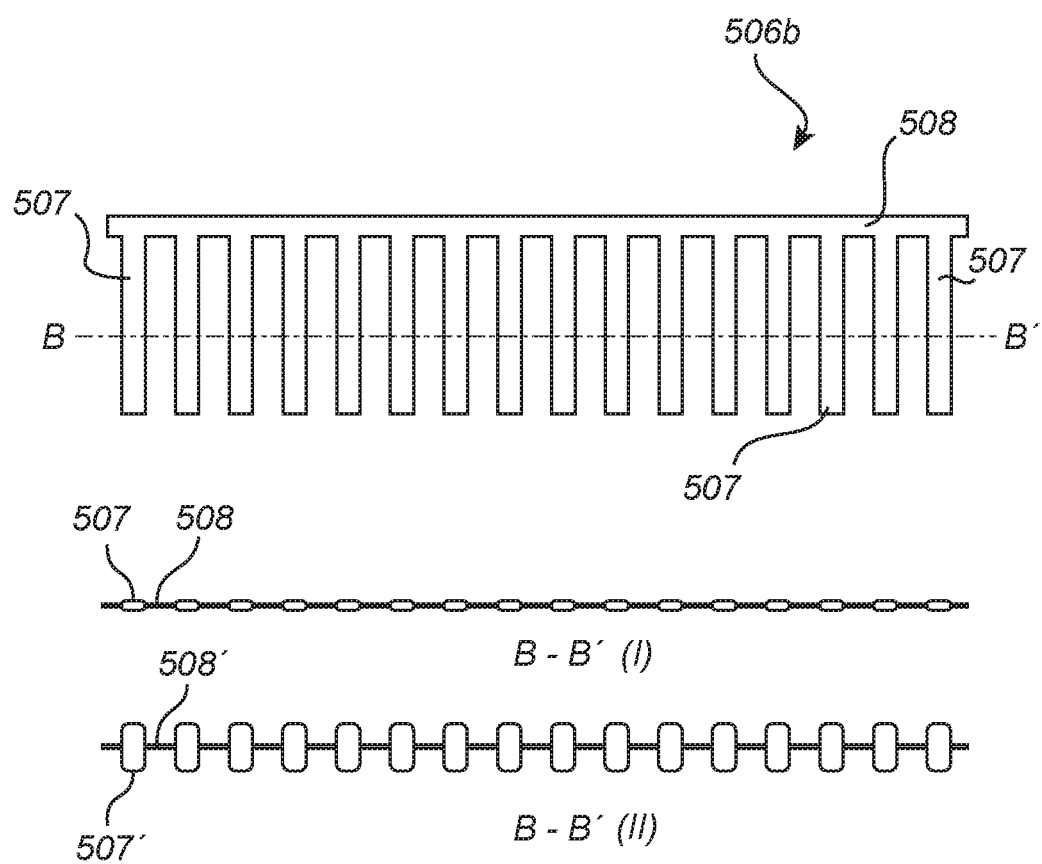
Figure 5C:
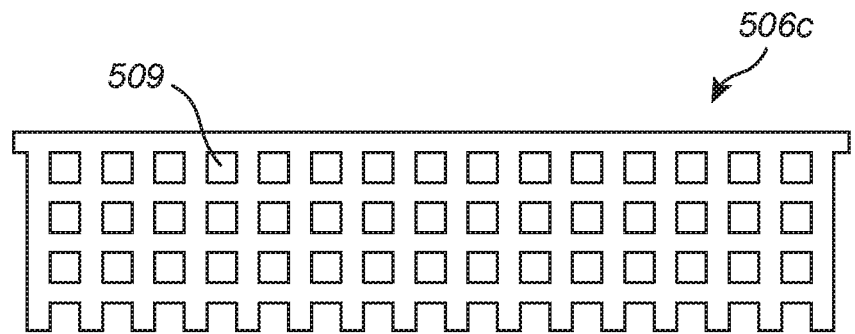
Figure 5D:
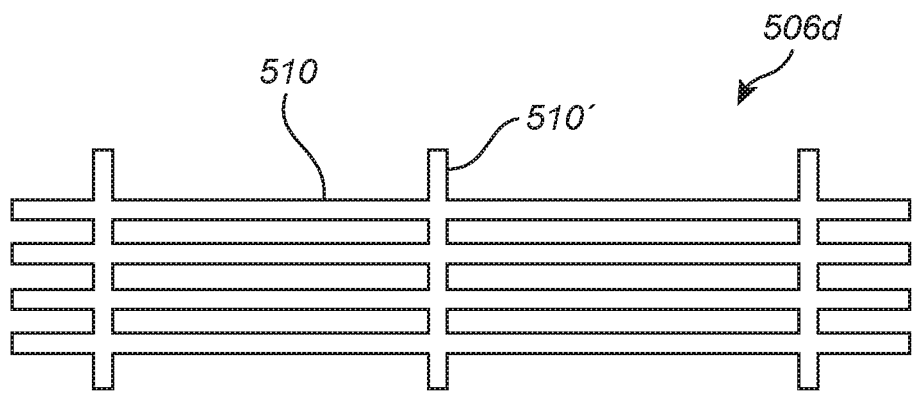

The inflatable element may be made in different shapes other than the plate shape shown in FIGS. 2A-C and FIG. 3. For example, as is shown in FIGS. 5A-D. The shape of the inflatable element may for example be comb-like as the inflatable element 506a shown in FIGS. 5A-B, or the inflatable element may comprise through-holes 509 as the inflatable element 506c shown in FIG. 5C, or the inflatable element may comprise bar sections 510, 510' as the inflatable element 506d forming a rail fence shape shown in FIG. 5D. The comb-like inflatable element 506a comprises elongated sections 507 (not all are numbered) interconnected with a base section 508. The base section 508 may itself be inflatable or, it may serve to interconnect the elongated sections 507. For example, the base section 508 may be in fluid communication with the elongated sections 507 such that that air or gas may inflate the elongated sections via the base section 509. Alternatively, the elongated sections 507 of the inflatable element 506b may be inflated independent of the base section 508, thus the elongated sections 507 may be inflated directly from an inflating unit (e.g., inflating unit 208) without the base section 508 being in fluid communication with the elongated sections 507. As an example of inflation of the inflatable element 506b, a cross section (B-B') of the inflatable element 506b having a base section 508 which is not inflatable is shown in FIG. 5B in a not inflated state (cross-section I) and in an inflated state (cross-section II). As is shown in the cross-sections (B-B', I, II, respectively) of FIG. 5B, the base section 508 is not inflated in this case. The different shapes of the inflatable element (506A-D shown in FIGS. 5A-D) may provide different stiffness under different loads. Thus, a suitable shape should be chosen for a particular protection performance or application.

Figure 7A:
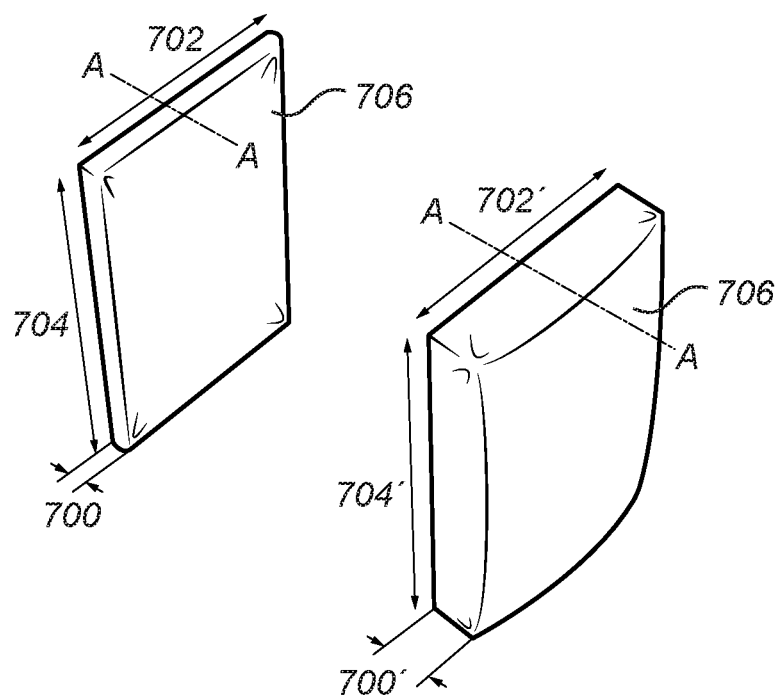
FIGS. 7A-B illustrates an inflatable element (FIG. 7A) and cross sections (FIG. 7B) of the inflatable element.
Figure 7B:
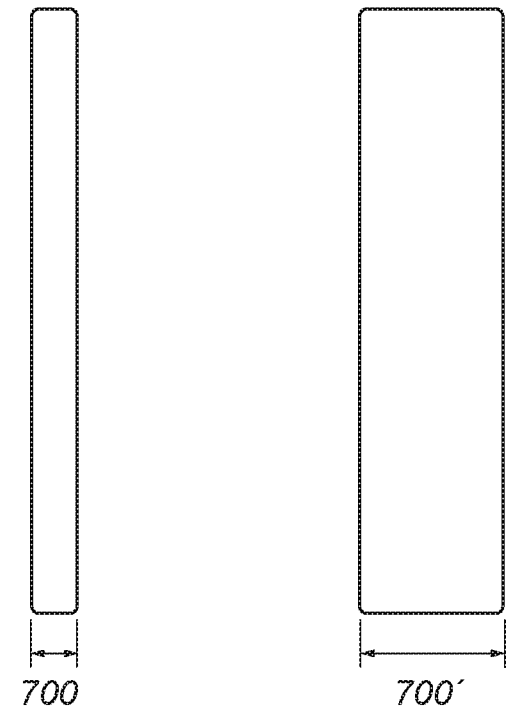

FIG. 7A illustrates a inflatable element 706 before inflation (left) and the inflatable element 706 when inflated (right) and FIG. 7B illustrates a cross-section of the inflatable element 706 (including the hollow inner space holding the air or gas) in the non-inflated state and in the inflated state. The inflatable element 706 is relatively flat, thus plate shaped. As a result of inflating the inflatable element 706, the cross-section of the inflatable element 706 increases in area, for example by the width 700 increasing to 700'. Furthermore, the air or gas inflating the inflatable element 706 do not leak out from the inflatable element 706, thus the inflatable element 706 is sealed after inflation. The sealing means that the inflated element is maintained in the inflated state for a time period. This may be done by not venting the inflatable element 706 after inflation, thus the inflating unit 208, 408 maintains a pressure on the pressurized gas or air in the inflatable element. This may apply also to the inflatable elements 206, 206',407. When the inflatable element is in an inflated state (as the inflated element on the right in FIG. 7A) the stiffness of the inflatable element is increased. The time period should extend during the crash event such that the energy storage cell is protected during the entire crash event, for example during at least 100 ms or more.

Figure 6:
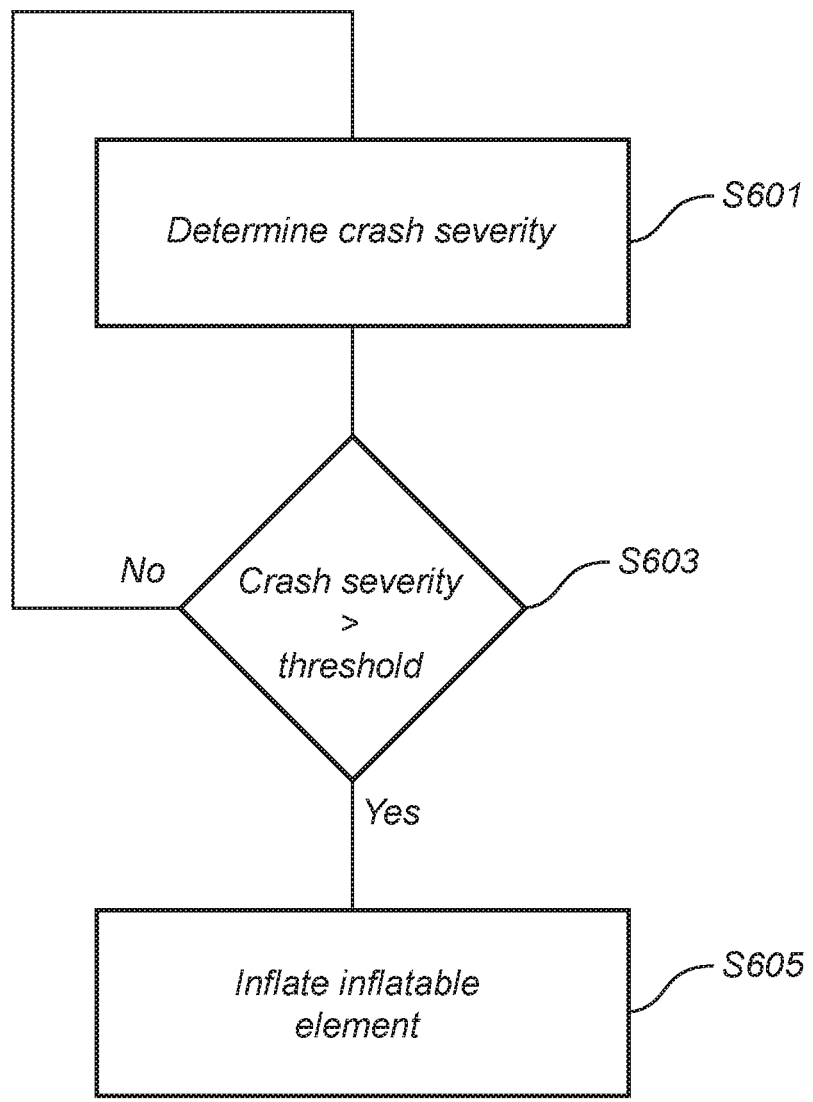
FIG. 6 provides a flow-chart of method steps according to an embodiment of the disclosure.

FIG. 6 provides a flow-chart of method steps according to an embodiment of the disclosure. The method steps are performed for protecting an energy storage cell of an energy storage module arranged in a vehicle. In a first step S601, a crash severity is determined. The crash severity is determined for example when the vehicle is involved in an accident. The crash severity may be determined by an accelerometer arranged on the vehicle. The crash severity may thus be in the form of an acceleration value and the threshold may be e.g., 10 G, 20 G, 30 G, 40 G, 50 G, 60 G, 70 G, or 80 G. The threshold may be different depending on the direction of the impact. Thus, there may an optional step of determining the impact direction of the accident and thereafter adjusting the threshold. As an example, the threshold for a frontal impact may be above 60 G and for a side crash above 50 G. In a subsequent step S603, it is determined if the determined crash severity exceeds the threshold. In the determined crash severity does not exceed the threshold, the method returns to step S601. However, if the determined crash severity exceeds the threshold, an inflating unit 208, 408 inflates S605 an inflatable element 206, 407 arranged adjacent to a respective energy storage cell. The inflating unit 208, 408 instantly inflates S605 the inflatable element 206, 407 as a response to the exceeding the threshold.

Additionally, variations to the disclosed embodiments can be understood and effected by the skilled person in practicing the claimed disclosure, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An energy storage module arrangeable in a vehicle, the energy storage module comprising:
   a casing for accommodating a plurality of energy storage cells stacked in a stacking direction;
   an inflatable element stacked with the plurality of energy storage cells in the stacking direction and arranged inside the casing between a casing wall and one of the plurality of energy storage cells, one side of the inflatable element arranged in contact with the one of the plurality of energy storage cells and an opposite side of the inflatable element arranged in contact with the casing wall, wherein the inflatable element at least partly covers a surface portion of the one of the plurality of energy storage cells; and
   an inflating unit configured to communicate with a detection unit configured to determine a crash severity in the event of an accident for the vehicle,
   wherein the inflating unit is operable to inflate the inflatable element when the crash severity exceeds a predetermined threshold, wherein the inflatable element is arranged in contact with the casing wall and with the one of the plurality of energy storage cells, wherein, in an inflated state, the inflatable element substantially fills a space from the one of the plurality of energy storage cells to the casing wall in at least one direction, wherein the inflatable element, in the inflated state, is configured to distribute loads resulting from the accident over a surface area of the one of the plurality of energy storage cells.

2. The energy storage module according to claim 1 wherein the inflatable element is plate-shaped.

3. The energy storage module according to claim 1 wherein the inflatable element is comb-shaped or rail fence-shaped or grid-shaped.

4. The energy storage module according to claim 3 wherein the inflatable element comprises through-holes.

5. The energy storage module according to claim 1 wherein the inflatable element is arranged to cover the entire surface portion of the energy storage cell.

6. The energy storage module according to claim 1 wherein the inflatable element is made from metal sheet, plastic or a fabric.

7. The energy storage module according to claim 1 further comprising the detection unit.

8. The energy storage module according to claim 1 further comprising a plurality of the energy storage cells stacked in the casing, wherein the inflatable element is arranged to cover at least a surface portion of more than one of the plurality of energy storage cells.

9. The energy storage module according to claim 1 further comprising a plurality of the energy storage cells stacked in the casing;
wherein the inflatable element is a first inflatable element, the module further comprises a second inflatable element arranged to at least partly cover a surface portion of a second one of the plurality of stacked energy storage cells on a side of the stack of energy storage cells different from a side of the stack where the first inflatable element is arranged;
wherein the inflating unit is operable to inflate the first inflatable element and the second inflatable element if the crash severity exceeds a predetermined threshold.

10. The energy storage module according to claim 1 further comprising a plurality of the energy storage cells, wherein the plurality of energy storage cells includes first and second stacks of energy storage cells arranged adjacent to each other, wherein the inflatable element extends to at least partly cover a surface portion of an energy storage cell of each of the first and second stacks of energy storage cells.

11. The energy storage module according to claim 1 wherein the energy storage cell comprises a Li-ion battery cell.

12. A method for protecting an energy storage cell of an energy storage module arranged in a vehicle, wherein the energy storage module comprises a casing for accommodating a plurality of energy storage cells in a stacking direction and an inflatable element stacked with the plurality of energy storage cells in the stacking direction and arranged inside the casing between a casing wall and one of the plurality of energy storage cells, one side of the inflatable element arranged in contact with the one of the plurality of energy storage cell and an opposite side of the inflatable element arranged in contact with the casing wall, wherein the inflatable element at least partially covers a surface portion of the one of the plurality of energy storage cells, the method comprising:
    determining a crash severity in the event of an accident for the vehicle; and
    when the crash severity exceeds a predetermined threshold, inflating the inflatable element arranged between the casing and the one of the plurality of energy storage cells, wherein the inflatable element at least partly covers a surface portion of the one of the plurality of energy storage cells, wherein the inflatable element is arranged in contact with the casing wall and with the one of the plurality of energy storage cells wherein, when inflated, the inflatable element substantially fills a space from the one of the plurality of energy storage cells to the casing wall in at least one direction, wherein the inflatable element, when inflated, is configured to distribute loads resulting from the accident over a surface area of the one of the plurality of energy storage cells.

13. The method according to claim 12 further comprising: maintaining the inflatable element in an inflated state for a time period.

14. The method according to claim 12 further comprising: determining an impact direction of the accident; and
adjusting the predetermined threshold according to the impact direction.

* * * * *